United States Patent
Yamaguchi et al.

(10) Patent No.: US 9,423,002 B2
(45) Date of Patent: Aug. 23, 2016

(54) METAL BELT AND DRIVING MECHANISM WITH SAME METAL BELT

(71) Applicant: KYOCERA Document Solutions Inc., Osaka-shi, Osaka (JP)

(72) Inventors: Akihiro Yamaguchi, Osaka (JP); Hidehisa Konishi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 14/434,234

(22) PCT Filed: Apr. 10, 2014

(86) PCT No.: PCT/JP2014/060399
§ 371 (c)(1),
(2) Date: Apr. 8, 2015

(87) PCT Pub. No.: WO2014/192438
PCT Pub. Date: Dec. 4, 2014

(65) Prior Publication Data
US 2015/0233445 A1    Aug. 20, 2015

(30) Foreign Application Priority Data
May 28, 2013   (JP) .................. 2013-111648

(51) Int. Cl.
*F16G 1/20* (2006.01)
*F16G 1/00* (2006.01)
(Continued)

(52) U.S. Cl.
CPC ...... *F16G 1/20* (2013.01); *F16H 7/02* (2013.01); *G03G 15/757* (2013.01)

(58) Field of Classification Search
CPC ............ F16G 5/16; F16H 7/02; F16H 55/36; G03G 15/757; B66B 15/04
USPC .................................................. 474/272, 237
See application file for complete search history.

(56) References Cited

U.S. PATENT DOCUMENTS

| | | | | |
|---|---|---|---|---|
| 894,126 A | * | 7/1908 | Eloesser | ............ F16H 55/36 474/167 |
| 1,290,894 A | * | 1/1919 | Bryan | ............ F16H 55/36 198/840 |

(Continued)

FOREIGN PATENT DOCUMENTS

| | | |
|---|---|---|
| EP | 1403551 A1 | 3/2004 |
| JP | 42-14022 | 8/1967 |

(Continued)

OTHER PUBLICATIONS

Chinese Office Action Dated Oct. 30, 2015.
(Continued)

*Primary Examiner* — Henry Liu
(74) *Attorney, Agent, or Firm* — Gerald E. Hespos; Michael J. Porco; Matthew T. Hespos

(57) ABSTRACT

A metal belt (300) is an endless belt formed of a strip body. The metal belt (300) includes a belt overlapping portion in which at least two ring pieces (310a, 320a) formed by deformation due to a compressive stress inherent in the belt doubly overlap in a ring radial direction in a natural state where no external force is applied. Further, the metal belt (300) has a cross-sectional shape convex radially outwardly in a cross-section perpendicular to a circumferential direction of the belt in a state reached by annularly spreading the belt in the natural state.

6 Claims, 11 Drawing Sheets

(51) Int. Cl.
  *F16G 5/00* (2006.01)
  *F16G 9/00* (2006.01)
  *F16H 7/02* (2006.01)
  *G03G 15/00* (2006.01)

(56) References Cited

U.S. PATENT DOCUMENTS

| | | | | |
|---|---|---|---|---|
| 2,274,512 A * | 2/1942 | Weimer | F16H 7/02 | 474/148 |
| 2,569,367 A * | 9/1951 | Bradner | C25D 1/04 | 204/212 |
| 2,711,815 A * | 6/1955 | Lorig | B65G 15/42 | 198/690.2 |
| 2,808,730 A * | 10/1957 | Shank | B65G 39/02 | 29/895.22 |
| 2,920,494 A * | 1/1960 | Dodwell | F16G 5/16 | 474/148 |
| 2,966,065 A * | 12/1960 | Renner | B65G 39/071 | 193/37 |
| 3,288,338 A * | 11/1966 | Morrow | B65G 39/071 | 226/193 |
| 3,478,609 A * | 11/1969 | Beindorf | F16H 7/02 | 474/142 |
| 3,490,285 A * | 1/1970 | Donath | F16H 7/12 | 474/187 |
| 3,523,462 A * | 8/1970 | Beindorf | F16G 5/10 | 29/460 |
| 3,604,283 A * | 9/1971 | Van Doorne | F16G 1/26 | 474/265 |
| 3,719,098 A * | 3/1973 | Graves | B65G 23/06 | 474/153 |
| 3,772,930 A * | 11/1973 | Lamport | F16G 1/20 | 474/153 |
| 3,851,535 A * | 12/1974 | Presentey | F16H 55/36 | 474/166 |
| 3,949,621 A * | 4/1976 | Beusink | F16G 5/16 | 29/235 |
| 4,465,469 A * | 8/1984 | Cataldo | F16G 5/16 | 474/201 |
| 4,553,951 A * | 11/1985 | Pavone | F16G 1/28 | 346/139 A |
| 4,619,634 A * | 10/1986 | Nakawaki | F16G 5/16 | 474/201 |
| 4,824,424 A * | 4/1989 | Ide | F16G 5/16 | 474/201 |
| 4,991,784 A * | 2/1991 | Schmid | B64G 9/00 | 242/390.3 |
| 4,995,855 A * | 2/1991 | Hasebe | F16H 55/38 | 474/167 |
| 5,108,351 A * | 4/1992 | Parsons | F16G 1/20 | 474/237 |
| 5,152,047 A * | 10/1992 | Kojima | F16G 1/21 | 156/137 |
| 5,214,472 A * | 5/1993 | Czuprynski | F16G 1/20 | 399/162 |
| 5,235,788 A * | 8/1993 | Maimets | B64G 4/00 | 244/172.6 |
| 5,397,277 A * | 3/1995 | Doring | F16H 7/023 | 474/148 |
| 5,411,444 A * | 5/1995 | Nakamura | F16H 7/02 | 474/148 |
| 5,427,581 A * | 6/1995 | McGrath | F16H 7/1254 | 474/101 |
| 5,470,271 A * | 11/1995 | Briggs | G03G 15/75 | 451/39 |
| 5,685,793 A * | 11/1997 | Van Blaricom | F16G 5/00 | 474/33 |
| 5,728,252 A * | 3/1998 | Kniazzeh | B32B 37/0053 | 100/176 |
| 5,870,924 A * | 2/1999 | Fahimi | G11B 23/08757 | 360/130.21 |
| 6,041,476 A * | 3/2000 | deNormand | E05D 13/1207 | 16/196 |
| 6,090,004 A * | 7/2000 | Kanehara | F16G 5/16 | 474/201 |
| 6,217,471 B1 * | 4/2001 | Brandsma | B21D 53/14 | 474/201 |
| 6,371,448 B1 * | 4/2002 | De Angelis | B66B 7/06 | 254/374 |
| 6,401,871 B2 * | 6/2002 | Baranda | B66B 7/06 | 187/251 |
| 6,416,433 B1 * | 7/2002 | Linnenbrugger | F16H 9/125 | 474/242 |
| 6,419,208 B1 * | 7/2002 | Baranda | B66B 15/04 | 254/390 |
| 6,488,123 B2 * | 12/2002 | Pitts | B66B 19/02 | 187/251 |
| 6,612,954 B2 * | 9/2003 | Akagi | F16G 5/16 | 474/237 |
| 6,623,393 B2 * | 9/2003 | Koyama | F16G 5/16 | 474/201 |
| 6,629,904 B2 * | 10/2003 | Fujioka | F16G 5/163 | 474/201 |
| 6,708,383 B2 * | 3/2004 | Arikawa | F16G 5/16 | 29/407.05 |
| 6,997,836 B2 * | 2/2006 | Kanehara | F16G 5/163 | 474/201 |
| 7,089,801 B2 * | 8/2006 | Tange | G01N 3/08 | 73/818 |
| 7,168,279 B2 * | 1/2007 | Nakajima | B21B 5/00 | 451/49 |
| 7,354,365 B2 * | 4/2008 | Kanehara | F16G 5/16 | 474/242 |
| 7,367,909 B2 * | 5/2008 | Van Der Sluis | F16G 5/16 | 474/242 |
| 8,870,695 B2 * | 10/2014 | Nishimi | F16G 5/16 | 474/242 |
| 9,010,495 B2 * | 4/2015 | Prasad | B66B 15/04 | 187/254 |
| 2002/0019283 A1 * | 2/2002 | Mitsubayashi | F16G 5/16 | 474/272 |
| 2004/0256180 A1 * | 12/2004 | Eichhorn | B66B 15/04 | 187/254 |
| 2005/0101424 A1 | 5/2005 | Van Der Sluis | | |
| 2008/0145101 A1 | 6/2008 | Seto | | |
| 2009/0203478 A1 * | 8/2009 | Kobayashi | F16G 5/16 | 474/242 |
| 2010/0236869 A1 * | 9/2010 | Fargo | B66B 7/062 | 187/251 |
| 2011/0269591 A1 * | 11/2011 | Adomi | C21D 9/40 | 474/237 |
| 2011/0293329 A1 * | 12/2011 | Konishi | G03G 15/757 | 399/167 |
| 2012/0051788 A1 * | 3/2012 | Tsuji | G03G 15/757 | 399/167 |
| 2014/0064752 A1 * | 3/2014 | Tsuji | G03G 15/55 | 399/36 |
| 2014/0235384 A1 * | 8/2014 | Yamaguchi | G03G 15/757 | 474/93 |
| 2015/0233445 A1 * | 8/2015 | Yamaguchi | F16G 1/20 | 474/167 |

FOREIGN PATENT DOCUMENTS

| | | |
|---|---|---|
| JP | S5872754 A | 4/1983 |
| JP | 5-33284 | 5/1993 |
| JP | 2002-45938 | 2/2002 |
| JP | 2003-145427 | 5/2003 |
| JP | 2011125892 A | 6/2011 |
| JP | 2012218004 A | 11/2012 |

OTHER PUBLICATIONS

European Search Report Dated Dec. 18, 2015.
International Search Report of Jul. 15, 2014.

* cited by examiner

METAL BELT AND DRIVING MECHANISM WITH SAME METAL BELT

TECHNICAL FIELD

The present invention relates to a metal belt and a driving mechanism with the metal belt.

BACKGROUND ART

Conventionally, a gear mechanism is widely used as a driving mechanism for an image forming unit such as a photoconductive drum and a transfer roller in an image forming apparatus such as a copier. A gear mechanism composed of resin gears is inexpensive. However, this gear mechanism tends to cause banding and jitter in an output image due to reduced rigidity, gear mesh vibration and the like. Thus, there is also a method using a traction drive with high rigidity and no gear mesh as a driving mechanism. However, this method is very high in cost and unsuitable for the development of cost competitive products.

Accordingly, a metal belt deceleration driving method for mounting and driving a metal belt between pulleys on two shafts has been and is being studied. In this method, a pair of pulleys (drive pulley and driven pulley) having different diameters are used to realize a predetermined speed reducing ratio. The metal belt mounted on these pulleys is shaped to be linear between the pulleys and curved along the pulleys. Thus, conventional metal belts have a problem that metal fatigue occurs due to the repetition of such a shape change and durability against stresses (tensile stress, bending stress) applied to the metal belts from the pulleys is reduced to cause fracture. To solve this problem, a method has been proposed which gives durability against tensile stress by applying a solution treatment to a metal belt and, thereafter, plastically deforming the metal belt and applying an aging treatment to actively remove a remaining stress (Japanese Examined Patent Publication No. H05-33284).

SUMMARY OF INVENTION

Methods for actively removing a compressive stress remaining in a metal belt as in the method described in patent literature 1 are known. However, a metal belt is not known in which a compressive stress is actively caused to remain in the belt and to which high durability against tensile stress is given.

The present invention aims to provide a metal belt to which high durability against tensile stress is applied by actively causing a compressive stress to remain and a driving mechanism with the metal belt.

A metal belt according to one aspect of the present invention is an endless belt formed of a strip body. The metal belt includes a belt overlapping portion in which at least two ring pieces formed by deformation due to a compressive stress inherent in the belt doubly overlap in a ring radial direction in a natural state where no external force is applied. Further, the metal belt has a cross-sectional shape convex radially outwardly in a cross-section perpendicular to a circumferential direction of the belt in a first state reached by annularly spreading the belt in the natural state.

A driving mechanism according to another aspect of the present invention includes a metal belt and a pulley on which the metal belt is mounted, and the metal belt has the above configuration.

An object, features and advantages of the present invention will become more apparent upon reading the following detailed description along with the accompanying drawings.

DESCRIPTION OF EMBODIMENT (First Embodiment)

<Image Forming Apparatus>

Figure 1:
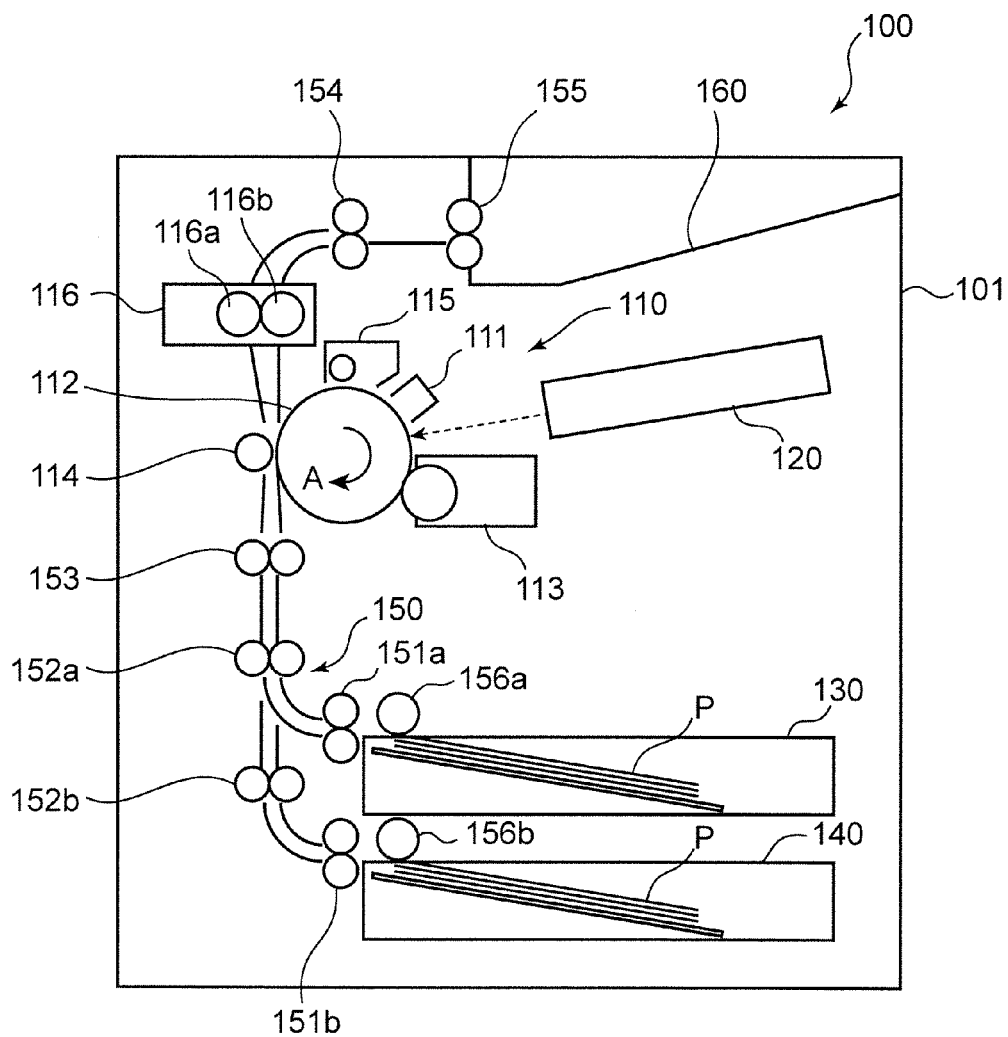
FIG. 1 is a schematic sectional view of a printer according to one embodiment of the present invention.

Hereinafter, a printer (image forming apparatus) with a driving mechanism including a metal belt of the present invention is described. FIG. 1 is a schematic view of a printer 100 according to one embodiment of the present invention. Note that the image forming apparatus is not limited to the printer and may be a copier, a facsimile machine, a multi-function peripheral or the like.

The printer 100 mainly includes a box-shaped housing 101, an image forming unit 110 housed in the housing 101, an optical scanning device 120, a sheet cassette 130 and a sheet cassette 140. The sheet cassettes 130, 140 are detachably mounted in a lower part of the printer 100.

The image forming unit 110 is for performing a process of forming a toner image on a sheet P and includes a charging device 111, a photoconductive drum 112, a developing device 113, a transfer roller 114, a cleaning device 115 and a fixing unit 116.

The photoconductive drum 112 is a cylindrical member and an electrostatic latent image and a toner image are formed on a peripheral surface thereof. The photoconductive drum 112 is driven in a direction of an arrow A upon receiving a drive force from an unillustrated motor. The charging device 111 substantially uniformly charges the surface of the photoconductive drum 112.

The developing device 113 forms a toner image by supplying toner to the peripheral surface of the photoconductive drum 112 having an electrostatic latent image formed thereon. The developing device 113 includes a developing roller for carrying toner and an unillustrated screw for agitating and conveying the toner. The toner image formed on the photoconductive drum 112 is transferred to a sheet P picked up from the sheet cassette 130 or 140 and conveyed to a conveyance path 150. Toner is supplied to this developing device 113 from an unillustrated toner container.

The transfer roller 114 is arranged to laterally face the photoconductive drum 112 and a transfer nip portion is formed by the both. The transfer roller 114 is made of a rubber material or the like having electrical conductivity and a transfer bias is applied thereto to transfer a toner image formed on the photoconductive drum 112 to a sheet P. The cleaning device 115 cleans the peripheral surface of the photoconductive drum 112 after the toner image is transferred.

The fixing unit 116 includes a fixing roller 116a with a built-in heater and a pressure roller 116b provided at a position facing the fixing roller 116a. The fixing unit 116 fixes a toner image transferred to a sheet P to the sheet P by conveying the sheet P having the toner image formed thereon while heating it by the fixing roller 116a.

The optical scanning device 120 forms an electrostatic latent image by irradiating laser light corresponding to image data input from an external apparatus such as a personal computer to the peripheral surface of the photoconductive drum 112 substantially uniformly charged by the charging device 111.

The sheet cassettes 130, 140 store a plurality of sheets P used for image formation. The conveyance path 150 for sheet conveyance is arranged between the sheet cassettes 130, 140 and the image forming unit 110. Feed roller pairs 151, conveyor roller pairs 152 and a registration roller pair 153 are provided in the conveyance path 150. Further, a conveyor roller pair 154 and a discharge roller pair 155 for discharging a sheet P to a sheet discharge tray are arranged downstream of the fixing unit 116.

The driving mechanism of the present invention is used, for example, in a part to be rotationally driven based on a metal belt deceleration driving method out of the above parts provided in the printer 100. The part to be driven by the driving mechanism is not particularly limited. For example, the photoconductive drum 112, the developing roller provided in the developing device 113, the transfer roller 114, the fixing roller 116a or the pressure roller 116b provided in the fixing unit 116, or a feed roller pair 151a, a feed roller pair 151b, a conveyor roller pair 152a, a conveyor roller pair 152b, the registration roller pair 153, a pickup roller 156 or a pickup roller 157 provided in the conveyance path 150 can be considered as such. Note that the driving mechanism is described in detail later.

Next, an image forming operation of the printer 100 is briefly described. First, the peripheral surface of the photoconductive drum 112 is substantially uniformly charged by the charging device 111. The charged peripheral surface of the photoconductive drum 112 is exposed to light by laser light emitted from the optical scanning device 120, whereby an electrostatic latent image of an image to be formed on a sheet P is formed. This electrostatic latent image is visualized as a toner image by supplying the toner from the developing device 113 to the peripheral surface of the photoconductive drum 112. On the other hand, the sheet P is fed to the conveyance path 150 from the sheet cassette 130 (or sheet cassette 140) by the pickup roller 156a (or pickup roller 156b) and conveyed by the feed roller pair 151a (or feed roller pair 151b) and the conveyor roller pair 152a (or conveyor roller pair 152b). Thereafter, the sheet P is temporarily stopped by the registration roller pair 153 and fed to the transfer nip portion between the transfer roller 114 and the photoconductive drum 112 at a predetermined timing. The toner image is transferred to the sheet P by the passage of the sheet P through the transfer nip portion. After this transfer operation is performed, the sheet P is conveyed to the fixing unit 116 and the toner image is fixed to the sheet P. Thereafter, the sheet P is discharged to the sheet discharge tray 160 by the conveyor roller pair 154 and the discharge roller pair 155.

<Driving Mechanism 200>

Figure 2:
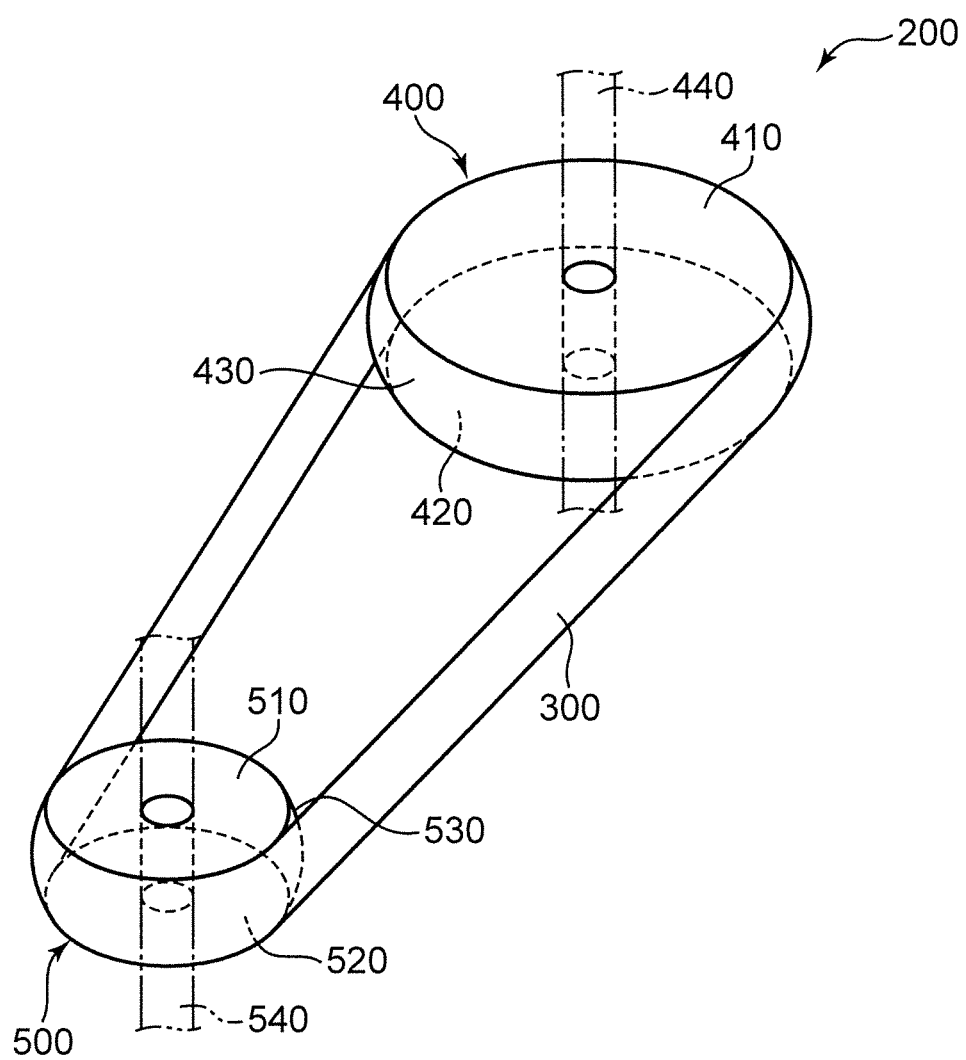
FIG. 2 is a schematic perspective view of a driving mechanism according to one embodiment of the present invention.

Next, a driving mechanism 200 including a metal belt 300 of the present invention is described. FIG. 2 is a schematic perspective view of the driving mechanism 200 according to one embodiment of the present invention. The driving mechanism 200 includes the metal belt 300 and a pair of pulleys (driven pulley 400 and drive pulley 500) on which the metal belt 300 is mounted. The driving mechanism 200 is, for example, a mechanism for rotationally driving each part provided in the printer 100 described above (see FIG. 1) based on the metal belt deceleration driving method. Each component of the driving mechanism 200 for rotationally driving the photoconductive drum 112 (see FIG. 1) is described as an example below.

(Pulley)

Figure 3A:
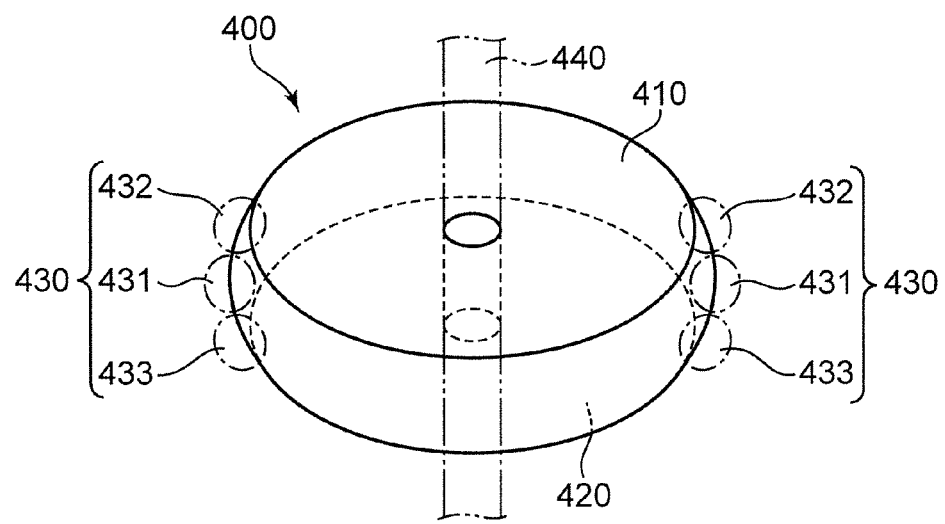
FIG. 3A is a schematic perspective view showing the shape of a driven pulley.
Figure 3B:
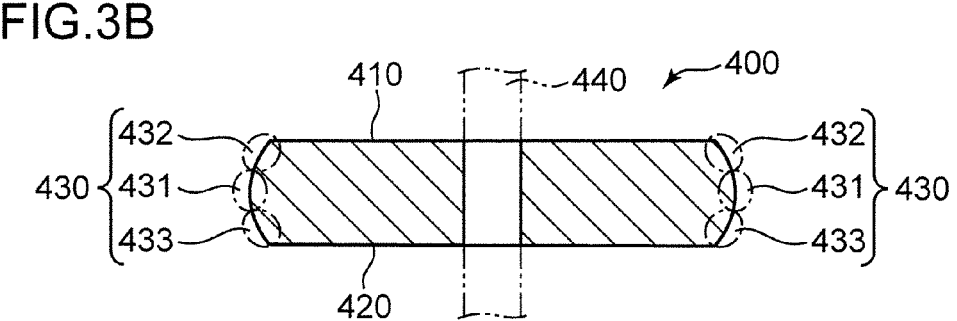
FIG. 3B is an axial sectional view of the driven pulley.

The pair of pulleys include the driven pulley 400 and the drive pulley 500. FIG. 3A is a schematic perspective view showing the shape of the driven pulley 400, and FIG. 3B is a sectional view of the driven pulley 400 along a width direction (direction perpendicular to a circumferential direction). The driven pulley 400 has an upper surface 410, a lower surface 420 and a side peripheral surface 430 and has a cross-sectional shape convex radially outwardly in a cross-section perpendicular to the circumferential direction (so-called crown shape).

More specifically, the upper surface 410 and the lower surface 420 are both flat and circular and the side peripheral surface 430 has a curved shape bulging radially outwardly. This curvature is formed as follows. A central region 431 in a width direction of the side peripheral surface 430 bulges most radially outwardly and a bulging distance of the side peripheral surface 430 becomes gradually shorter from the central region 431 toward peripheral edge regions (respectively referred to as an upper peripheral edge region 432 and a lower peripheral edge region 433) connected to the upper surface 410 and the lower surface 420. Note that terms such as the "upper surface 410" and the "lower surface 420" in this embodiment are specified to determine directions for the sake of convenience to clarify the description and are not of the nature to limit, for example, installation directions of the pulleys.

The driven pulley 400 with the bulging side peripheral surface 430 in this way is held in contact with a radially inner side of a metal belt 300b when the metal belt 300b in a normal state (see FIG. 5) to be described later is mounted. The driven pulley 400 is mounted on a first output shaft 440 vertically extending through the centers of the upper surface 410 and the lower surface 420. The first output shaft 440 is coupled to a rotary shaft of the photoconductive drum 112 (see FIG. 1). The driven pulley 400 rotates together with the first output shaft 440.

Referring back to FIG. 2, the drive pulley 500 has, similarly to the driven pulley 400, an upper surface 510, a lower surface 520 and a side peripheral surface 530 and has a cross-sectional shape convex radially outwardly in a cross-section perpendicular to the circumferential direction (so-called crown shape). More specifically, the upper surface 510 and the lower surface 520 are both flat and circular and the side peripheral surface 530 has a curved shape bulging radially outwardly. The driven pulley 500 with the bulging side peripheral surface 530 in this way is complementarily held in contact with a radially inner side of the metal belt 300b when the metal belt 300b in the normal state (see FIG. 5) to be described later is mounted. The driven pulley 500 is mounted on a second output shaft 540 vertically extending through the centers of the upper surface 510 and the lower surface 520 and to be rotationally driven by an unillustrated motor. The driven pulley 500 rotates together with the second output shaft 540.

The driven pulley 400 and the drive pulley 500 are fixed at appropriate positions by an unillustrated holding member. Diameters of the driven pulley 400 and the drive pulley 500 are not particularly limited and are approximately set to achieve a desired speed reducing ratio. Generally, the diameter of the driven pulley 400 is larger than that of the drive pulley 500. A ratio of the diameter of the driven pulley 400 to that of the driven pulley 500 is set at 1:2 to 1:10, for example, in the case of use as the driving mechanism for the photoconductive drum 112.

(Metal Belt 300)

The metal belt 300 is an endless belt formed of a strip body made of metal. By using the belt made of metal, a driving mechanism having high rigidity and suppressed gear mesh as compared with the conventional case of using resin gears is obtained. The metal belt 300 is used by being mounted on the driven pulley 400 and the drive pulley 500 in an annularly spread state (see FIG. 2).

A circumferential length of the metal belt 300 is not particularly limited and a circumferential length of a metal belt normally used in a general-purpose driving mechanism can be adopted. Such a circumferential length can be, for example, in a range of 180 to 360 mm. Further, a width of the metal belt 300 is not particularly limited and a width of a metal belt normally used in a general-purpose driving mechanism can be adopted. Such a width is, for example, 5 to 10 mm. Further, a thickness of the metal belt 300 is not particularly limited, but preferably 30 μm or less and more preferably 20 to 30 μm. If the thickness is 30 μm or less, a bending stress applied to the metal belt 300 is small when the metal belt 300 is mounted on the driven pulley 400 and the drive pulley 500 and largely curved on the peripheries of these pulleys. Thus, the metal belt 300 is less likely to be fractured from the peripheral edge regions and has relatively high durability for a thick belt.

A material of the metal belt 300 is not particularly limited, but is preferably made of nonmagnetic metal. By using nonmagnetic metal as the material, the metal belt 300 is hard to rust. Thus, the durability of the metal belt 300 against tensile stress is even less likely to be reduced. Examples of nonmagnetic metal include aluminum, copper, silver and austenite-based stainless steel. Among these, nonmagnetic metal is preferably austenite-based stainless steel in terms of high toughness.

A compressive stress is inherent in the metal belt 300. Note that the compressive stress and a method for producing the metal belt 300 with an inherent compressive stress are described later. In this specification, outer and inner sides of the metal belt 300 are defined as follows to clarify description. Specifically, the metal belt in an annularly spread state by applying an external force to the metal belt in a natural state where no external force is applied (metal belt 300a) is referred to as the metal belt in a normal state (first state reached by annularly spreading the metal belt in the natural state, see FIG. 5) (metal belt 300b), and the metal belt in a state turned inside out from the normal state (see FIG. 8) is referred to as the metal belt in an inside-out state (second state reached by turning the metal belt in the first state inside out) (metal belt 300c). Each possible state of the metal belt 300 is described below.

(Metal Belt 300a in Natural State)

Figure 4:
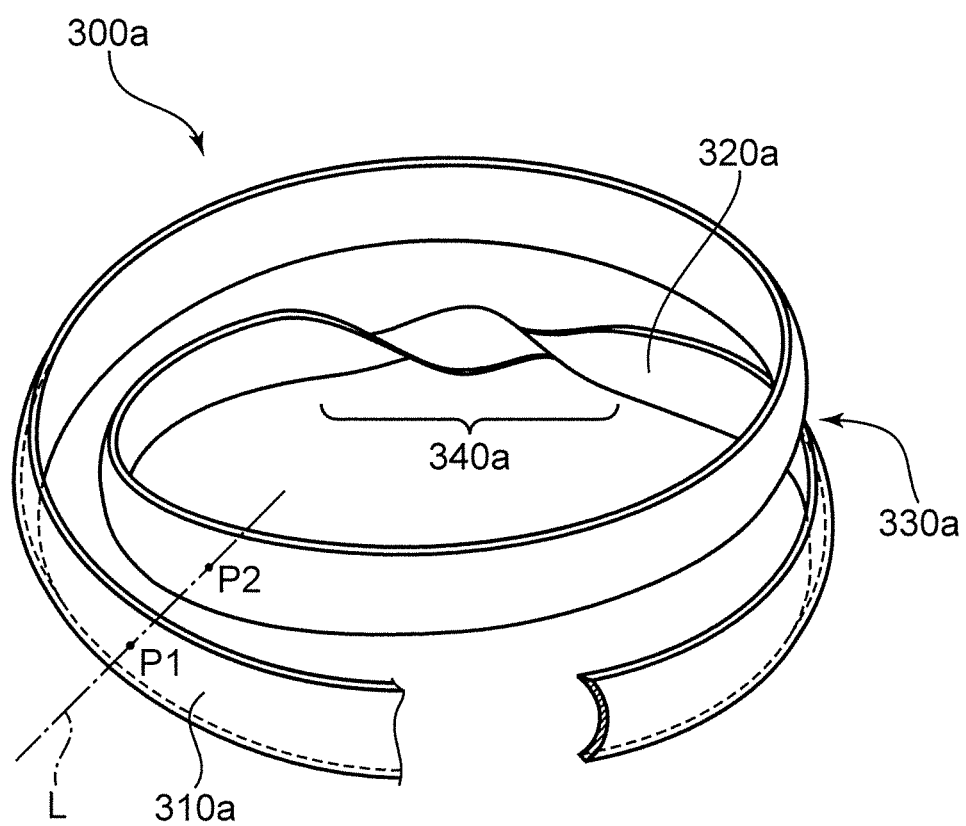
FIG. 4 is a partial sectional view of a metal belt in a natural state.

FIG. 4 is a partial sectional view of the metal belt 300a in the natural state where no external force is applied. The metal belt 300a is formed with two ring pieces (first ring piece 310a and second ring piece 320a). The first and second ring pieces 310a, 320a have a belt overlapping portion where they overlap in a radial direction thereof (belt overlapping portion where at least two ring pieces formed by deformation due to an inherent compressive stress doubly overlap in a ring radial direction).

In this embodiment, the belt overlapping portion means a part of the first ring piece 310a and a part of the second ring piece 320a present on an arbitrary straight line L extending from an inner side to an outer side in a radial direction of the metal belt 300a. Specifically, as shown in FIG. 4, a point P1 as a part of the first ring piece 310a and a point P2 as a part of the second ring piece 320a are present on the straight line L. In this case, the first and second ring pieces 310a, 320a at least overlap to form the belt overlapping portion on the straight line L.

Further, the metal belt 300a includes an intersecting portion 330a where the first and second ring pieces 310a, 320a intersect. The second ring piece 320a includes a twisted portion 340a where the outer and inner sides of the belt are twisted. Note that the first and second ring pieces 310a, 320a are continuous since the metal belt 300a itself is endless. Thus, a boundary between the first and second ring pieces 310a, 320a is not clear. In this specification, with the intersecting portion 330a defined as the boundary for the sake of convenience, the ring piece formed on a radially outer side is referred to as the first ring piece 310a and the ring piece formed on a radially inner side is referred to as the second ring piece 320a. Such first and second ring pieces 310a, 320a are parts formed by spontaneous deformation of the belt itself due to the compressive stress inherent in the metal belt 300b in the normal state to be described later. The twisted portion 340a is formed in either one of the first and second ring pieces 310a, 320a during deformation from the normal state to the natural state. A circumferential length of the twisted portion 340a is not particularly limited and is set at an appropriate length based on the width of the metal belt 300a and various physical properties (rigidity, etc.).

(Metal Belt 300b in Normal State)

Figure 5:
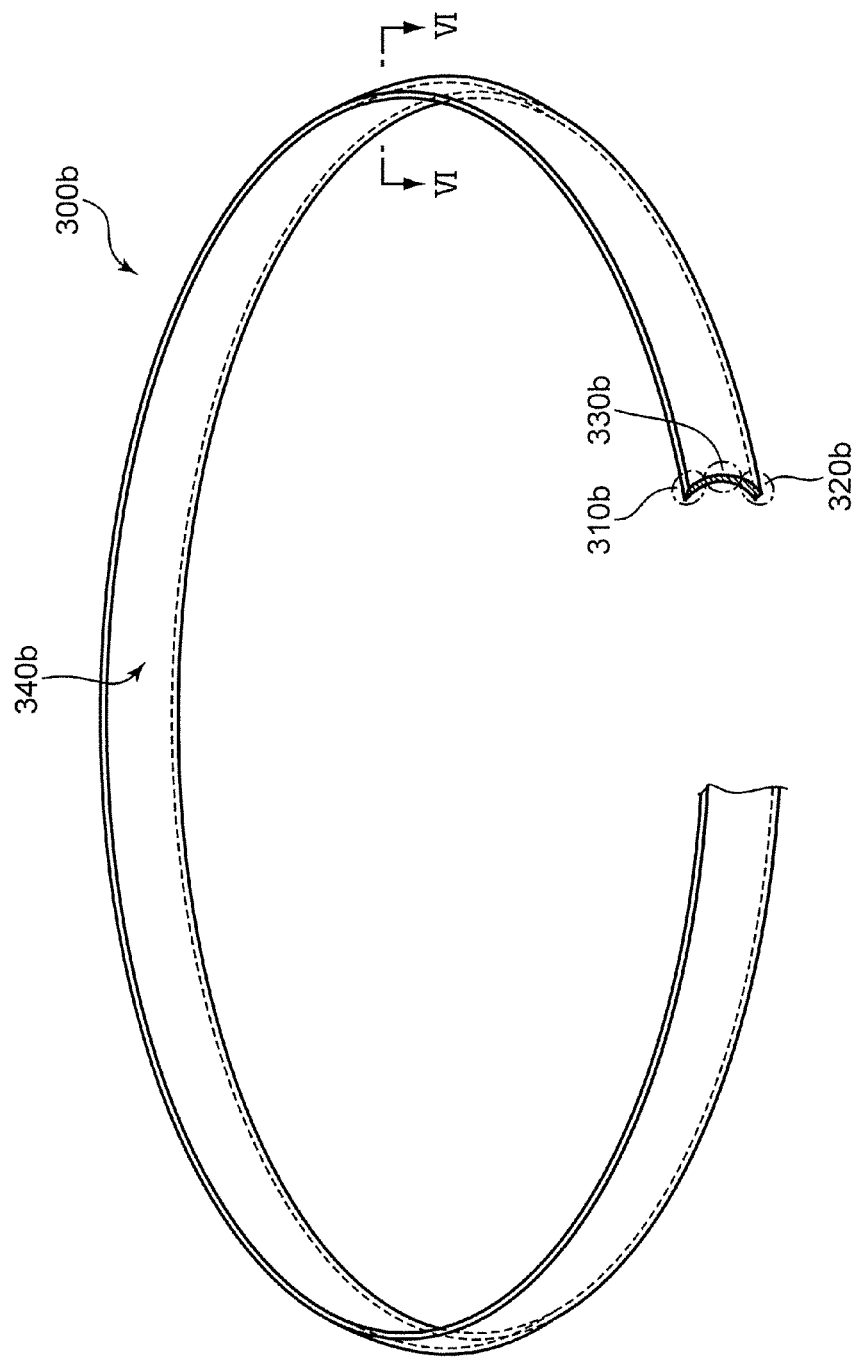
FIG. 5 is a perspective view, partly cut away, of a metal belt in a normal state.
Figure 6:
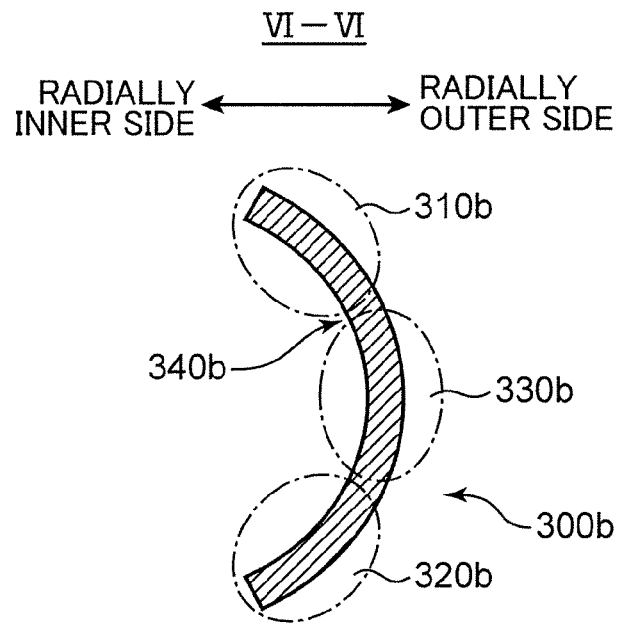
FIG. 6 is a sectional view along line VI-VI of FIG. 5.

FIG. 5 is a perspective view, partly cut away, of the metal belt 300b in the normal state. FIG. 6 is a sectional view (widthwise sectional view) along line VI-VI of FIG. 5. The metal belt 300b in the normal state is obtained by annularly spreading the metal belt 300a in the natural state (see FIG. 4) by applying an external force as described above. The metal belt 300b includes an upper peripheral edge region 310b to be located proximate to the upper surfaces of the pulleys, a lower peripheral edge region 320b to be located proximate to the lower surfaces of the pulleys and a central region 330b located between the upper and lower peripheral edge regions 310b, 320b, for example, when being mounted on the pair of pulleys described above. The metal belt 300b has a cross-sectional shape convex radially outwardly in a cross-section perpendicular to a circumferential direction of the metal belt 300*b*, and the central region 330*b* has a curved shape most bulging radially outwardly. A curved surface 340*b* to be complementarily held in contact with the side peripheral surfaces of the pulleys described above is formed on a radially inner side of the metal belt 300*b*.

A compressive stress inherent in the metal belt 300*b* in the normal state roughly acts toward the radially inner side of the metal belt 300*b* in the entirety of the metal belt 300*b*. Further, the compressive stress inherent in the metal belt 300*b* is larger than a force for retaining the metal belt 300*b* in shape (retaining force in the normal state). Thus, if an external force is removed from the metal belt 300*b* in the normal state, the compressive stress deforms the metal belt 300*b* by winding it in a twisted manner. The deformed metal belt 300*b* is formed with the first and second ring pieces 310*a*, 320*a* and the belt overlapping portion where these doubly overlap (see FIG. 4). Further, associated with such deformation, the compressive stress is weakened and balanced with the force for retaining the metal belt 300*a* in the natural state in shape (retaining force in the natural state). As a result, the metal belt 300*a* is retained in shape in the natural state.

Figure 7:
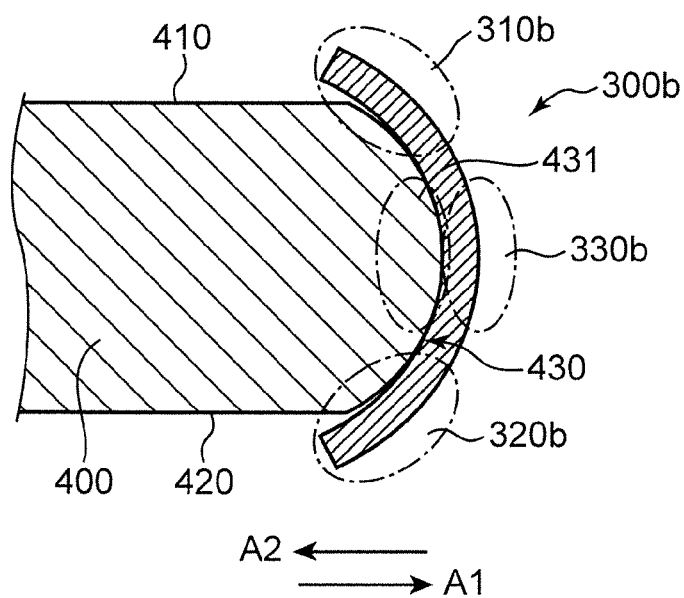
FIG. 7 is a widthwise sectional view enlargedly showing a part of the metal belt mounted on the driven pulley.

The metal belt 300*b* in the normal state is mounted on the pair of pulleys described above. FIG. 7 is a widthwise sectional view enlargedly showing a part of the metal belt 300*b* mounted on the driven pulley 400. The central region 330*b* of the curved surface 340*b* formed on the radial inner side of the metal belt 300*b* is mainly held in contact with the side peripheral surface 430 of the driven pulley 400 (metal belt mounted on the pulley in a first stress part). As described above, the compressive stress inherent in the metal belt 300*b* in the normal state roughly acts toward the radially inner side of the metal belt 300*b* in the entirety of the metal belt 300*b*. Thus, a stress (arrow A1) applied from the driven pulley 400 to the metal belt 300*b* and the compressive stress (arrow A2) inherent in the metal belt 300*b* are easily canceled. As a result, a tensile stress applied from the driven pulley 400 to the metal belt 300*b* is reduced. Thus, durability of the metal belt 300*b* against tensile stress is less likely to be reduced.

Further, the stress applied from the driven pulley 400 to the metal belt 300*b* is likely to be directly applied to the central region 330*b* of the metal belt 300*b* (first stress part where a first stress is inherent and which is formed in a widthwise central region of the metal belt) held in contact with the central region 431 of the side peripheral surface 430 of the driven pulley 400, but less likely to be applied to the upper and lower peripheral edge regions 310*b*, 320*b* of the metal belt 300*b* (second stress part where a second stress smaller than the first stress is inherent and which is formed in a peripheral edge region of the metal belt). Thus, the metal belt 300*b* is less likely to be fractured from the upper and lower peripheral edge regions 310*b*, 320*b* and has high durability. Note that a relationship of stresses produced between the unillustrated drive pulley and the metal belt 300*b* in the normal state mounted on the drive pulley is not described since being similar to that of stresses produced between the driven pulley 400 and the metal belt 300*b* in the normal state.

(Metal Belt 300*c* in Inside-Out State)

Figure 8:
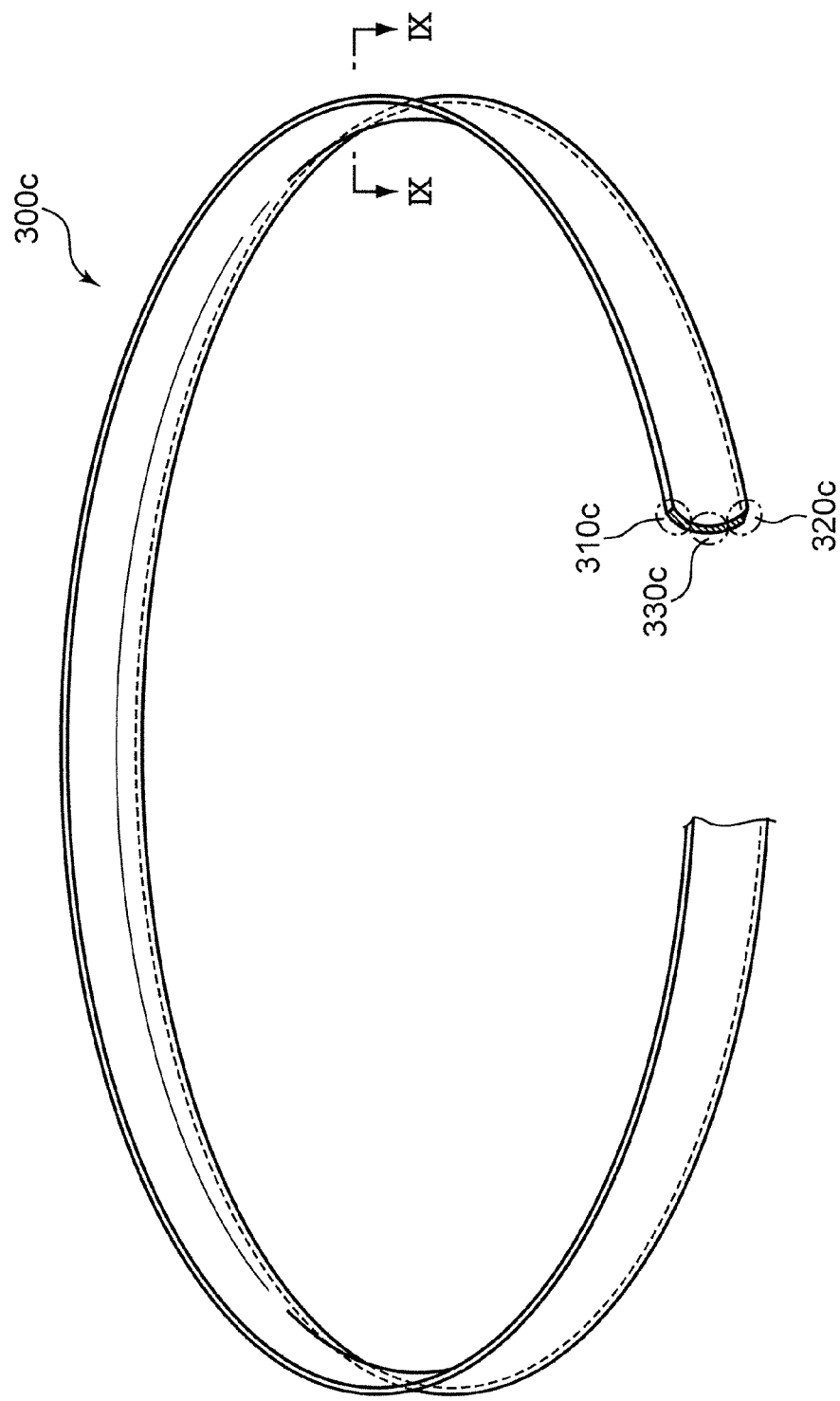
FIG. 8 is a perspective view, partly cut away, of a metal belt in an inside-out state.
Figure 9:
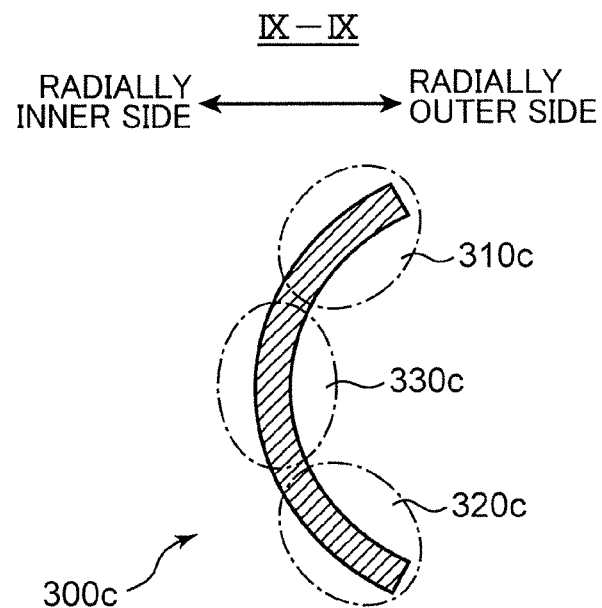
FIG. 9 is a sectional view along line IX-IX of FIG. 8.

FIG. 8 is a perspective view, partly cut away, of the metal belt 300*c* in the inside-out state. FIG. 9 is a sectional view (widthwise sectional view) along line IX-IX of FIG. 8. The metal belt 300*c* in the inside-out state is obtained by turning the metal belt 300*b* in the normal state (see FIG. 5) inside out as described above. Since the metal belt 300 of this embodiment can be used not only in the normal state, but also in the inside-out state, yield is improved and cost is reduced.

The metal belt 300*c* includes an upper peripheral edge region 310*c* to be located proximate to the upper surface 410 of the driven pulley 400, a lower peripheral edge region 320*c* to be located proximate to the lower surface 420 of the driven pulley 400 and a central region 330*c* located between the upper and lower peripheral edge regions 310*c*, 320*c*, for example, when being mounted on the driven pulley 400 described above. The metal belt 300*c* has a cross-sectional shape convex radially inwardly in a cross-section perpendicular to a circumferential direction of the metal belt 300*c*, and the central region 330*c* has a curved shape most bulging radially inwardly. Since having such a shape, the metal belt 300*c* is easily mounted on the driven pulley 400. Thus, convenience in production is improved.

Figure 10:
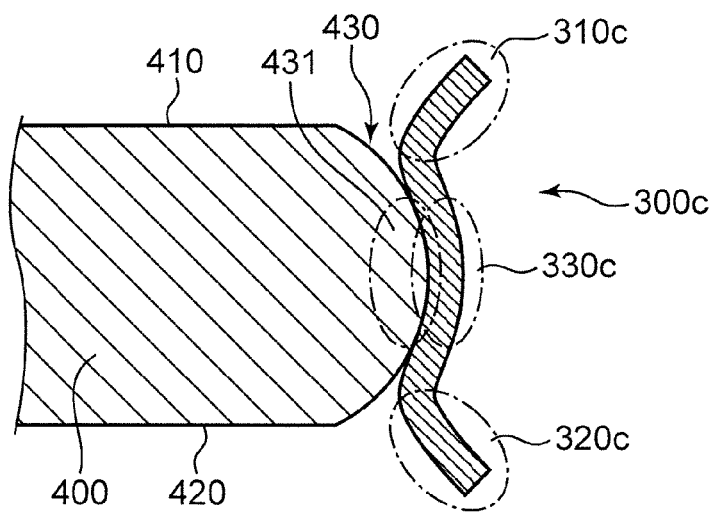
FIG. 10 is a widthwise sectional view enlargedly showing a part of the metal belt in the inside-out state mounted on the driven pulley.

The metal belt 300*c* in the inside-out state is mounted on the pair of pulleys described above (metal belt mounted on the pulleys in the second state). FIG. 10 is a widthwise sectional view enlargedly showing a part of the metal belt 300*c* in the inside-out state mounted on the driven pulley 400. Since the metal belt 300*c* is such that the central region 330*c* is convex radially inwardly, the central region 330*c* is mainly held in contact with the side peripheral surface 430 of the driven pulley 400. Note that, in FIG. 10, the central region 330*c* of the metal belt 300*c* is deformed along the curved shape of the driven pulley 400 due to contact with the central region 431 of the driven pulley 400. Thus, a stress applied from the driven pulley 400 to the metal belt 300*c* is likely to be applied to the central region 330*c* of the metal belt 300*c*, but less likely to be applied to the upper and lower peripheral edge regions 310*c*, 320*c*. As a result, the metal belt 300*b* is less likely to be fractured from the peripheral edge regions and has high durability. Further, even if the upper or lower peripheral edge region 310*c*, 320*c* is damaged, this damage is less likely to be spread. Note that the relationship of stresses produced between the unillustrated drive pulley and the metal belt 300*c* in the inside-out state mounted on the drive pulley is not described since being similar to the aforementioned relationship of stresses produced between the driven pulley 400 and the metal belt 300*c* in the inside-out state.

By the above mode, the metal belt 300 can be mounted on the driven pulley 400 and the drive pulley 500 in both normal and inside-out states (see FIG. 2). In the driving mechanism 200, when the second output shaft 540 is rotated by driving the unillustrated motor, the drive pulley 500 connected to the second output shaft 540 rotates. The metal belt 300 travels with the rotation of the drive pulley 500. By the travel of the metal belt 300, the driven pulley 400 rotates and the first output shaft 440 connected to the driven pulley 400 rotates. In this way, the photoconductive drum 112 coupled to the first output shaft 440 rotates. The printer 100 provided with such a driving mechanism 200 (see FIG. 1) is low in cost and suitable for long-term use since the metal belt 300 with high durability is used.

<Method for Producing Metal Belt 300>

Figure 11A:
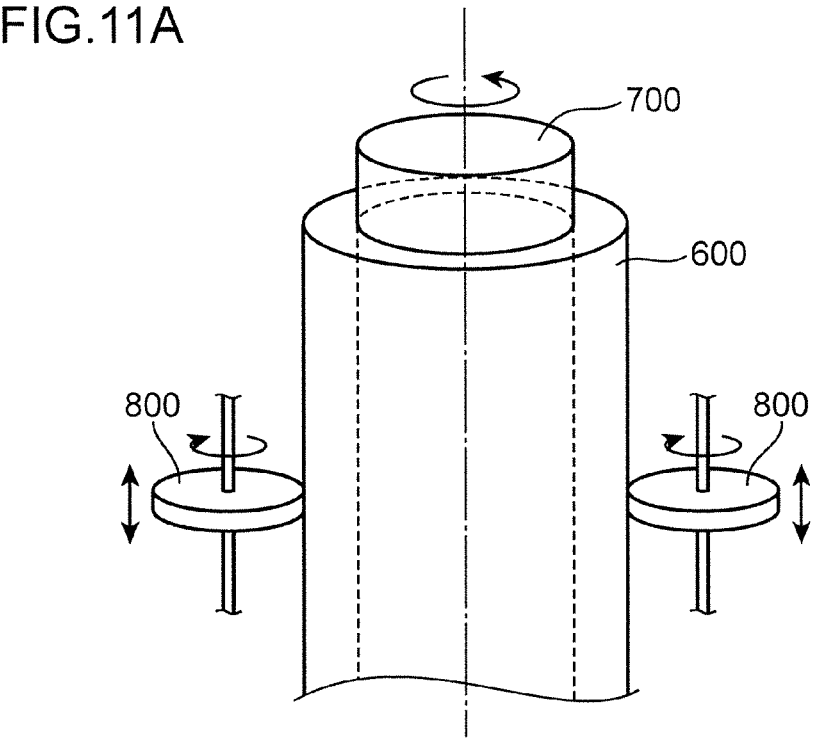
FIG. 11A is a schematic view showing a metal belt production method.
Figure 11B:
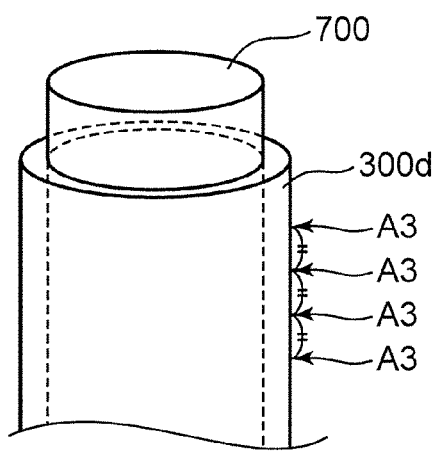
FIG. 11B is a schematic view showing the metal belt production method.
Figure 11C:
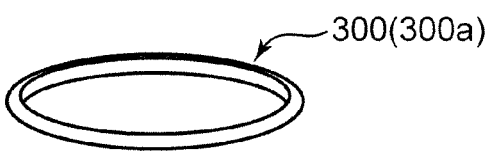
FIG. 11C is a schematic view showing the metal belt production method.

Next, a method of the present invention for producing the metal belt 300 is described with reference to the drawings. FIGS. 11A to 11C are schematic diagrams showing the method for producing the metal belt 300, wherein FIG. 11A shows a belt raw material 600 being worked, FIG. 11B shows a metal belt 300*d* before being cut and FIG. 11C shows the obtained metal belt 300.

The metal belt 300 can be produced by applying rotational plastic working to the belt raw material 600 before being worked. A method for producing the metal belt 300 by applying spinning (an example of the rotational plastic working) to the tubular belt raw material 600 is illustrated below.

First, the tubular belt raw material 600 (material: SUS304, thickness of about 30 mm) as a material of the metal belt 300 is prepared. The belt raw material 600 is so mounted on a cylindrical rotating die (mandrel 700) that the die penetrates through a tube. The mandrel 700 is made of tool steel such as carbon steel and harder than the belt raw material 600. Subsequently, the belt raw material 600 is rotated together with the mandrel 700 and rollers 800 are pressed against the outer peripheral surface of the belt raw material 600 (see FIG. 11A).

The rollers 800 are made of tool steel such as die steel and harder than the belt raw material 600. A rotation speed of the mandrel 700 is not particularly limited and can be, for example, set at 200 rpm. The rollers 800 are mainly repeatedly moved in directions along a direction of a rotation axis of the mandrel 700 and draws out the belt raw material 600 by pressing it against the mandrel 700. At this time, a drawing amount of the belt raw material 600 by the rollers 800 is adjusted, whereby a compressive stress remains in the obtained metal belt 300. Such a drawing amount can be, for example, 0.5 to 1 (unit: mm).

As a result of drawing out, the belt raw material 600 is formed into a tubular shape having a thickness of, e.g. 30 μm or less (see FIG. 11B). The belt raw material after working (metal belt 300*d*) is cut in a direction perpendicular to the rotation axis at a cutting position A3 to have a predetermined width by a desired cutting apparatus, whereby the metal belt 300 is obtained (FIG. 11C). Note that the number of the rollers 800 is not particularly limited and has only to be one or more. Further, a diameter of the mandrel 700 is not particularly limited and appropriately selected in accordance with a target diameter of the metal belt 300. Further, the shape of the belt raw material 600 is not limited to the tubular shape and may be a flat plate shape. In this case, a centering processing and a dummy hole processing are applied to the vicinity of a center of the flat plate beforehand and the vicinity of the center is fixed in close contact with the tip of the mandrel using a push cup (fixing tool). Thereafter, the flat-plate shaped belt raw material is pressed against the mandrel and drawn out by rollers similarly to the above. The drawn out belt raw material is cut to have a predetermined width by a cutting apparatus similar to the above one and formed into the metal belt 300.

(Second Embodiment)

<Driving Mechanism>

Figure 12A:
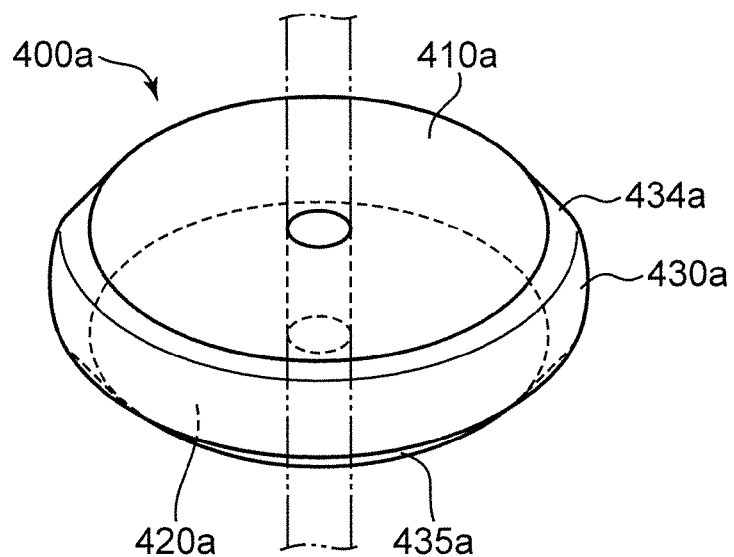
FIG. 12A is a schematic perspective view of a driven pulley.
Figure 12B:
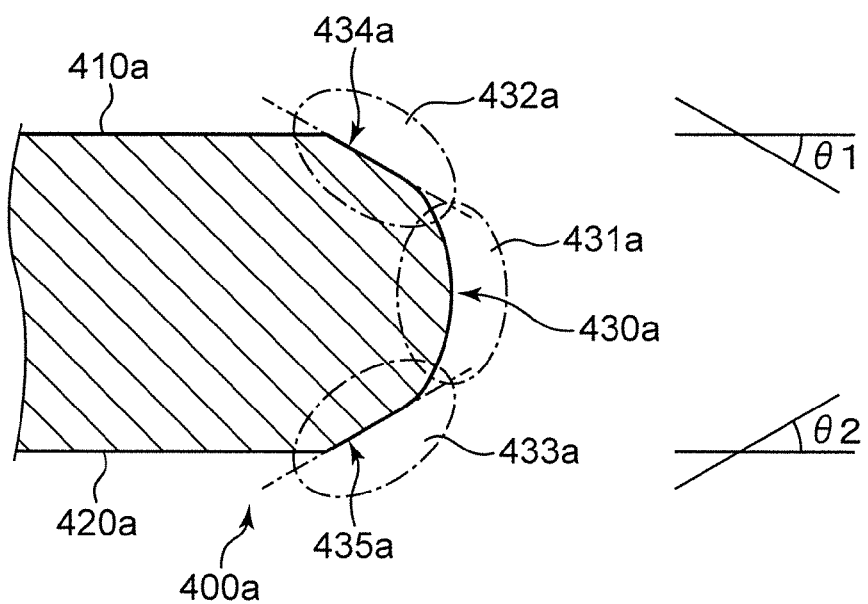
FIG. 12B is an axial sectional view of FIG. 12A.
Figure 13:
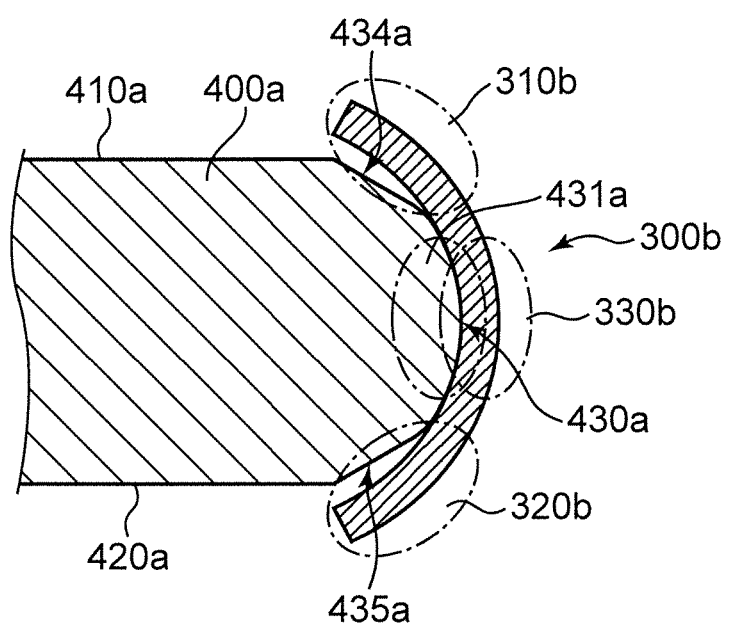
FIG. 13 is a widthwise sectional view enlargedly showing a part of a metal belt in a normal state mounted on the driven pulley.

A driving mechanism of another embodiment of the present invention is described below with reference to the drawings below. FIG. 12A is a schematic perspective view of a driven pulley 400*a*, and FIG. 12B is a widthwise sectional view enlargedly showing a part of the driven pulley 400*a*. FIG. 13 is a widthwise sectional view enlargedly showing a part of a metal belt 300*b* in a normal state mounted on the driven pulley 400*a*. The driving mechanism of this embodiment is similar in configuration to the driving mechanism 200 in the first embodiment except in that the shape of a side peripheral surface 430*a* of the driven pulley 400*a* is different from that of the side peripheral surface 430 (see FIG. 3B) of the driven pulley 400 in the first embodiment. Thus, repetitive description is omitted as appropriate.

The driven pulley 400*a* has an upper chamfered region 434*a* formed by chamfering an upper peripheral edge region 432*a* connected to an upper surface 410*a* and a lower chamfered region 435*a* formed by chamfering a lower peripheral edge region 433*a* connected to a lower surface 420*a*. A degree of chamfering is appropriately set based on physical properties of the metal belt 300*b* in the normal state (e.g. degree of deflection) and the width of the driven pulley 400*a*. For example, as shown in FIG. 12B, an angle θ1 of the upper chamfered region 434*a* with respect to the upper surface 410*a* can be set at 30 to 45°. Similarly, an angle θ2 of the lower chamfered region 435*a* with respect to the lower surface 420*a* can be set at 35 to 45°. The angles θ1, θ2 may be equal or may be different. The angles θ1, θ2 enable a suitable stress to be applied to the central region 330*b* of the mounted metal belt 300*b* when being in the above ranges.

The driven pulley 400*a* chamfered as described above is more likely to come into contact with a radially inner side of the central region 330*b* of the metal belt 300*b* in the normal state in a central region 431 a, but less likely to come into contact with the upper and lower peripheral edge regions 310*b*, 320*b* when the metal belt 300*b* in the normal state is mounted thereon as shown in FIG. 13. Thus, a stress applied from the driven pulley 400*a* to the metal belt 300*b* is particularly likely to be applied to the central region 330*b* of the metal belt 300*b*, but less likely to be applied to the peripheral edge regions. As a result, the metal belt 300*b* is less likely to be fractured from the upper and lower peripheral edge regions 310*b*, 320*b* and has high durability.

Note that chamfering applied to an unillustrated drive pulley is not described since being similar to the one applied to the driven pulley 400*a*.

Although the embodiments of the present invention have been described above, the present invention is not limited to these. For example, the following embodiments can be adopted.

(1) In the above embodiments, a case is illustrated where both the driven pulley and the drive pulley have a cross-sectional shape convex radially outwardly in the cross-section perpendicular to the circumferential direction. Instead of this, in the driving mechanism of the present invention, only either one of the pulleys (e.g. driven pulley) may be formed into the above shape and the other pulley (e.g. drive pulley) may be formed into a substantially cylindrical shape with a flat side peripheral surface. Further, in the driving mechanism of the present invention, both the driven pulley and the drive pulley may be formed into a substantially cylindrical shape.

(2) In the above embodiments, a case is illustrated where the driving mechanism includes the pair of pulleys (driven pulley and drive pulley). Instead of this, the driving mechanism of the present invention may include three or more pulleys.

(3) In the above embodiment (second embodiment), a case is illustrated where chamfering is applied to both the driven pulley and the drive pulley. Instead of this, in the driving mechanism of the present invention, chamfering may be applied to only either one of the pulleys (e.g. driven pulley).

According to the metal belt and the driving mechanism with the metal belt according to the present invention as described above, it is possible to provide a metal belt with high durability against tensile stress and a driving mechanism with the metal belt by actively causing a compressive stress to remain.

The invention claimed is:

1. A metal belt which is an endless belt formed of a strip body, comprising:
   a belt overlapping portion in which first and second ring pieces formed by deformation due to a compressive stress inherent in the belt doubly overlap in a ring radial direction in a natural state where no external force is applied, either one of the first and second ring pieces including a twisted portion where the outer and inner sides of the belt are twisted, wherein the metal belt has a cross-sectional shape convex radially outwardly in a cross-section perpendicular to a circumferential direction of the belt in a first state reached by annularly spreading the belt in the natural state.

2. The metal belt according to claim 1, wherein a thickness is 30 µm or less.

3. The metal belt according to claim 1, wherein the metal belt has a cross-sectional shape convex radially inwardly in a cross-section perpendicular to the circumferential direction in a second state reached by turning the belt in the first state inside out.

4. The metal belt according to claim 1, wherein the metal belt is made of nonmagnetic metal.

5. A driving mechanism, comprising a metal belt and a pulley on which the belt is mounted, wherein the metal belt:
is an endless belt formed of a strip body;
includes a belt overlapping portion in which at least two ring pieces formed by deformation due to a compressive stress inherent in the belt doubly overlap in a ring radial direction in a natural state where no external force is applied; and has a cross-sectional shape convex radially outwardly in a cross-section perpendicular to a circumferential direction of the metal belt in a first state reached by annularly spreading the belt in the natural state, and the pulley has a cross-sectional crown shape that is convex radially outwardly in a cross-section perpendicular to the circumferential direction, wherein the metal belt includes, in a state mounted on the pulley, a first stress part where a first stress is inherent and that is formed in a widthwise central region of the metal belt, and a second stress part where a second stress smaller than the first stress is inherent and that is formed in a peripheral edge region of the metal belt, the metal belt is mounted on the pulley in the first stress part, and a compressive stress inherent in the metal belt in the normal state acts toward the radially inner side of the belt in an entirety of the metal belt.

6. The driving mechanism according to claim 5, wherein the metal belt:
has a cross-sectional shape convex radially inwardly in a cross-section perpendicular to the circumferential direction in a second state reached by turning the belt in the first state inside out; and
is mounted on the pulley in the second state.

* * * * *